United States Patent [19]
Badejo et al.

[11] Patent Number: 5,868,828
[45] Date of Patent: Feb. 9, 1999

[54] HETEROCYCLIC-SUBSTITUTED QUINACRIDONE PIGMENTS

[75] Inventors: Ibraheem T. Badejo, N. Charleston, S.C.; Guenter Franke, Laechlengen, Germany

[73] Assignee: Bayer Corporation, Pittsburgh, Pa.

[21] Appl. No.: 81,849

[22] Filed: May 20, 1998

[51] Int. Cl.$^6$ .................................................. C09B 48/00
[52] U.S. Cl. .................. 106/497; 106/31.75; 106/31.76; 106/31.78; 106/495; 106/498; 546/49; 546/56
[58] Field of Search ................... 106/495, 497, 106/498, 31.75, 31.76, 31.78; 546/56, 49

[56] References Cited

U.S. PATENT DOCUMENTS

| | | | |
|---|---|---|---|
| 4,256,507 | 3/1981 | Kranz et al. | 106/495 |
| 4,310,359 | 1/1982 | Ehashi et al. | 106/494 |
| 4,439,240 | 3/1984 | Ganci | 106/495 |
| 4,455,173 | 6/1984 | Jaffe | 106/495 |
| 4,478,968 | 10/1984 | Jaffe | 524/88 |
| 4,541,872 | 9/1985 | Jaffe | 106/495 |
| 4,844,742 | 7/1989 | Jaffe | 106/448 |
| 4,895,949 | 1/1990 | Jaffe et al. | 546/56 |
| 5,137,576 | 8/1992 | Macholdt et al. | 106/495 |
| 5,145,524 | 9/1992 | Ganci | 106/493 |
| 5,194,088 | 3/1993 | Bäbler et al. | 106/412 |
| 5,229,515 | 7/1993 | Pfenninger et al. | 546/49 |
| 5,264,032 | 11/1993 | Dietz et al. | 106/411 |
| 5,286,863 | 2/1994 | Bäbler et al. | 546/56 |
| 5,334,727 | 8/1994 | Campbell | 548/373.1 |
| 5,368,641 | 11/1994 | Dietz et al. | 106/495 |
| 5,424,429 | 6/1995 | Hendi et al. | 546/49 |
| 5,453,151 | 9/1995 | Bäbler | 106/497 |
| 5,457,203 | 10/1995 | Hendi et al. | 546/56 |
| 5,755,872 | 5/1998 | Urban et al. | 106/495 |

OTHER PUBLICATIONS

W. Herbst and K. Hunger, Industrial Organic Pigments, 2$^{nd}$ ed (New York: VCH Publishers, Inc., month unavailable 1997), pp. 454–474.

S.S. Labana and L.L. Labana, "Quinarcridones" in Chemical Review, 67, 1–18 (month unavailable) 1967.

*Primary Examiner*—Mark L. Bell
*Assistant Examiner*—Scott L. Hertzog
*Attorney, Agent, or Firm*—Joseph C. Gil; Richard E. L. Henderson

[57] ABSTRACT

This invention relates to quinacridone pigments of formula (I)

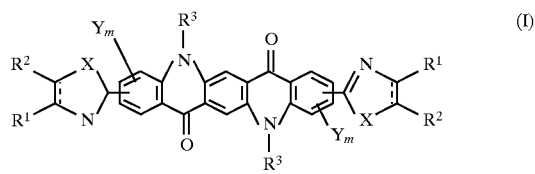

wherein

X is O, S, or NR;

R is hydrogen, $C_1$–$C_6$ alkyl, $C_5$–$C_7$ cycloalkyl, or $C_7$–$C_{16}$ aralkyl;

Y is $C_1$–$C_6$ alkyl, $C_1$–$C_6$ alkoxy, or halogen;

the dashed line represents an optional double bond;

$R^1$ and $R^2$ are independently hydrogen, $C_1$–$C_6$ alkyl, $C_5$–$C_7$ cycloalkyl, $C_6$–$C_{10}$ aryl, $C_7$–$C_{16}$ aralkyl, nitrile, or carboxyl or an ester or an amide thereof, or $R^1$ and $R^2$ together form a $C_5$–$C_8$ cycloaliphatic ring or a fused-on aromatic or heteroaromatic ring;

$R^3$ is hydrogen or $C_1$–$C_6$ alkyl; and m is 0, 1, or 2.

This invention further relates to the preparation and use of such quinacridone pigments.

8 Claims, No Drawings

HETEROCYCLIC-SUBSTITUTED QUINACRIDONE PIGMENTS

BACKGROUND OF THE INVENTION

This invention relates to novel heterocyclic-substituted quinacridone pigments that are useful for the coloring of plastics and other macromolecular materials, coating compositions and paints, and printing and ink jet inks.

The use of quinacridones as pigments is known. E.g., W. Herbst and K. Hunger, *Industrial Organic Pigments*, 2nd ed. (New York: VCH Publishers, Inc., 1997), pages 454–474, and S. S. Labana and L. L. Labana, "Quinacridones" in *Chemical Review*, 67, 1–18 (1967). Ring substitution of quinacridones can produce pigments having different coloristic and physical properties but the substituents of commercially useful pigments are typically alkyl, alkoxy, or halogen groups. E.g., Herbst and Hunger at pages 464–465. Quinacridones having more complex substituents are generally not themselves used as commercial pigments but are instead more commonly used as pigment additives to enhance physical and coloristic properties of other quinacridone pigments. E.g., U.S. Pat. Nos. 5,457,203, 5,453,151, 5,424,429, 5,368,641, 5,334,727, 5,286,863, 5,264,032, 5,137,576, 5,229,515, 5,194,088, 5,145,524, 4,895,949, 4,844,742, 4,541,872, 4,478,968, 4,455,173, 4,439,240, 4,256,507, and 4,310,359. Nevertheless, novel substituted quinacridones having suitably modified coloristic and physical properties would still be desirable. It has now been found that the introduction of certain heterocyclic substituents into quinacridones gives unusual properties, including colors not easily attained with quinacridone.

SUMMARY OF THE INVENTION

This invention relates to quinacridone pigments having formula (I)

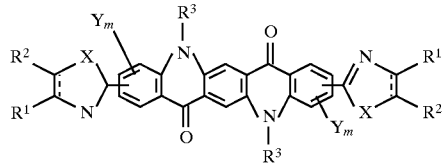

wherein

X is O, S, or NR;

R is hydrogen, $C_1$–$C_6$ alkyl (preferably methyl), $C_5$–$C_7$ cycloalkyl, or $C_7$–$C_{16}$ aralkyl;

Y is $C_1$–$C_6$ alkyl (preferably methyl), $C_1$–$C_6$ alkoxy (preferably methoxy), or halogen (preferably chlorine or fluorine);

the dashed line represents an optional double bond (i.e., a carbon—carbon single bond or a carbon—carbon double bond);

$R^1$ and $R^2$ are independently hydrogen, $C_1$–$C_6$ alkyl (preferably methyl), $C_5$–$C_7$ cycloalkyl, $C_6$–$C_{10}$ aryl, $C_7$–$C_{16}$ aralkyl, nitrile, or carboxyl or an ester or an amide thereof, or $R^1$ and $R^2$ together form a $C_5$–$C_8$ cycloaliphatic ring or a fused-on aromatic or heteroaromatic ring (preferably an unsubstituted or ring-substituted benzene ring);

$R^3$ is hydrogen or $C_1$–$C_6$ alkyl; and m is 0 (i.e., no Y is present, meaning that no quinacridone ring substituents other than hydrogen are present), 1, or 2.

This invention further relates to the preparation and use of such quinacridone pigments for the coloring of plastics and other macromolecular materials, coating compositions and paints, and printing and ink jet inks.

DETAILED DESCRIPTION OF THE INVENTION

As used herein, the term "$C_1$–$C_6$ alkyl" refers to straight or branched chain aliphatic hydrocarbon groups having from 1 to 6 carbon atoms, also propyl, butyl, pentyl, hexyl, and the isomeric forms thereof. The term "$C_5$–$C_7$ cycloalkyl" refers to cycloaliphatic hydrocarbons groups having from 5 to 7 carbon atoms. Examples of $C_5$–$C_7$ cycloalkyl are cyclopentyl, cyclohexyl, and cycloheptyl. The term "$C_6$–$C_{10}$ aryl" refers to phenyl and 1- or 2-naphthyl, as well as to phenyl and naphthyl groups substituted with alkyl, alkoxy, halogen, cyano, as defined herein. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. Examples of halogen are fluorine, chlorine, bromine, and iodine. As used herein, the term "carboxyl or an ester or amide thereof" refers to —COOH and corresponding esters —COOR$^i$ (in which R$^i$ is alkyl, cycloalkyl, aralkyl, or aryl) and amides —CONR$^{ii}$R$^{iii}$ (in which R$^{ii}$ and R$^{iii}$ are independently hydrogen, alkyl, cycloalkyl, aralkyl, or aryl).

The dashed line in the heterocyclic substituent represents an optional double bond, meaning that the bond between the two carbon atoms is either a carbon—carbon single bond (for which hydrogen atoms are present on the carbon atoms at each end of the bond, even where $R^1$ and $R^2$ are not hydrogen) or a carbon—carbon double bond (for which hydrogen atoms are not present on the carbon atoms at each end of the bond unless, of course, $R^1$ and $R^2$ are hydrogen). Such carbon—carbon double bonds are typical of compounds in which $R^1$ and $R^2$ together form a used-on aromatic ring but can also be present even when $R^1$ and $R^2$ together form a fused-on cycloaliphatic ring or no ring at all.

Suitable heterocyclic-substituted quinacridone pigments include compounds of formula (I) in which the heterocyclic substituents are attached to the two outer benzene rings. Preferred heterocyclic-substituted quinacridone pigments are those in which the heterocyclic substituents are located para to the quinacridone ring nitrogen atoms (i.e., in a 2,9-substitution pattern) and which are represented by the formula (Ia)

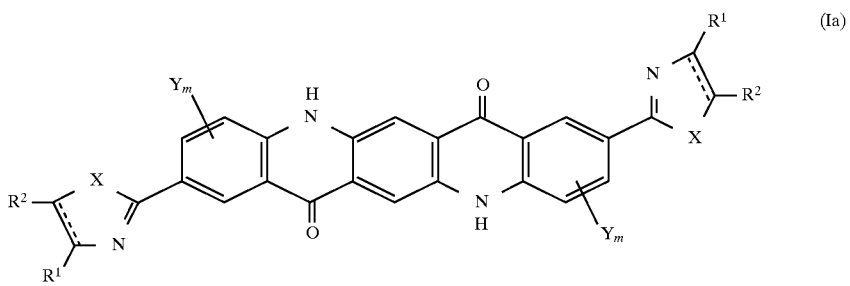

(Ia)

wherein X, Y, $R^1$, $R^2$, and the dashed line are defined as above.

Particularly preferred heterocyclic-substituted quinacridone pigments include compounds of formula (Ib)

Heterocyclic-substituted quinacridone pigments prepared according to the invention can be used alone or in combination with other pigments, including blends and solid solutions with other heterocyclic-substituted quinacridone

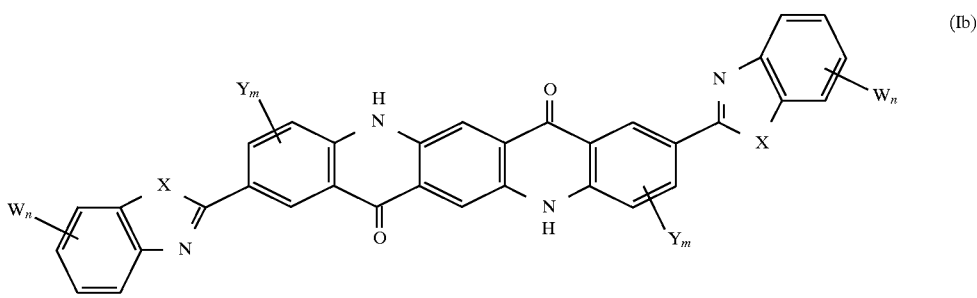

(Ib)

in which Y and m are defined as above; X is O, S, or NH; and W is $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, or nitrile and n is 0 or 1 to 4 (preferbly 0), or any two adjacent W groups (which requires that n be at least 2) form a fused-on aromatic ring in a polyaromatic system. Quinacridones of formula (Ib) thus correspond to compounds of formula (Ia) in which $R^1$ and $R^2$ together form a fused-on benzene ring. The terms $C_1$–$C_6$ alkyl, $C_1$–$C_6$ alkoxy, $C_5$–$C_7$ cycloalkyl, $C_6$–$C_{10}$ aryl, $C_7$–$C_{16}$ aralkyl, hydroxy, halogen, and nitrile have the same meanings as given above. The term "$C_5$–$C_7$ cycloalkoxy" refers to cycloalkyl oxy groups having from 5 to 7 carbon atoms. Examples of $C_5$–$C_7$ cycloalkoxy are cyclopentyloxy, cyclohexyloxy, and cycloheptyloxy. The term "$C_6$–$C_{10}$ aryloxy" refers to phenoxy and 1- or 2-naphthoxy, in which the aryl portion can optionally be substituted as described above for "aryl." The term "$C_7$–$C_{16}$ aralkoxy" refers to $C_1$–$C_6$ alkoxy substituted with $C_6$–$C_{10}$ aryl such that the total number of carbon atoms is from 7 to 16. An example of $C_7$–$C_{16}$ aralkoxy is benzyloxy.

The preferred heterocyclic-substituted quinacridone of formula (Ib) are those in which the fused-on benzene rings of the heterocyclic group are unsubstituted (i.e., no W is present, meaning that no substituents other than hydrogen are present). Particularly preferred heterocyclic-substituted quinacridone pigments of formula (Ib) are those in which X is NH, O, or S and m and n are both 0 (meaning that no Y or W groups are present).

pigments of the invention or other pigments known in the art. Examples of suitable other pigments include unsubstituted or substituted quinacridones, quinacridonequinones, diketopyrrolopyrroles, perylenes, phthalocyanaines, dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, and azo compounds.

Heterocyclic-substituted quinacridone pigments of formula (I) can be prepared by any of several methods known in the art. In a preferred preparative method, quinacridones of formula (I) are prepared by the condensation of carboxy-substituted quinacridones of formula (II)

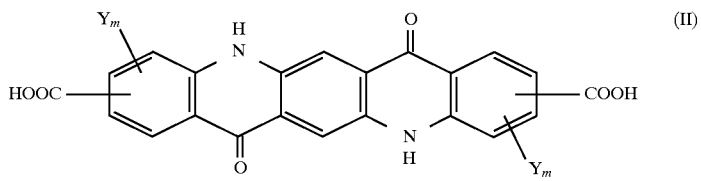

(II)

in which each Y is independently $C_1$–$C_6$ alkyl (preferably methyl), $C_1$–$C_6$ alkoxy (preferably methoxy), or halogen (preferably chlorine or fluorine) and m is 0, 1, or 2 (preferably 0), with amines of formula (III)

(III)

in which X is O, S, or NR (wherein R is hydrogen, $C_1$–$C_6$ alkyl, $C_5$–$C_7$ cycloalkyl, or $C_7$–$C_{16}$ aralkyl); the dashed line represents an optional double bond such that the bond between the two carbon atoms is either a carbon—carbon single bond or a carbon—carbon double bond (i.e., forming an amine having the formula $(R^1)(XH)C=C(NH_2)(R^2)$); and $R^1$ and $R^2$ are independently hydrogen, $C_1$–$C_6$ alkyl (preferably methyl), $C_5$–$C_7$ cycloalkyl, $C_6$–$C_{10}$ aryl, $C_7$–$C_{16}$ aralkyl, nitrile, or a carboxylic ester or amide, or $R^1$ and $R^2$ together form a $C_5$–$C_8$ cycloaliphatic ring (i.e., where $R^1$ and $R^2$ together are a $C_3$–$C_6$ aliphatic group that may contain a heteroatom such as O, S, or N, may be substituted, and may be unsaturated) or a fused-on aomatic or heteroaromatic ring (preferably an unsubstituted or substituted benzene ring). Compounds of formula (III) having a carbon—carbon double bond in the position represented by the dashed line are typically aromatic amines in which $R^1$ and $R^2$ together form a fused-on aromatic ring (such as aminobenzenes used to prepare compounds of formula (Ib)), but double bonds in this location can be present even when $R^1$ and $R^2$ do not form a fused-on (hetero)aromatic ring. Although $R^1$ and $R^2$ cannot be free carboxylic acid groups (i.e., —COOH) or their salts when this method is used, the corresponding esters and amides can often be used to prepare corresponding esters or amides of formula (I), thereby providing an indirect pathway to the free carboxylic acids. For example, esters can be hydrolyzed by known methods to the free carboxylic acids or their salts.

Heterocyclic-substituted quinacridones of formula (I) in which $R^3$ is $C_1$–$C_6$ alkyl can be prepared in an analogous manner using suitable N-alkylated precursors or intermediates. However, it is generally preferable to alkylate quinacridones of formula (I) in which $R^3$ is hydrogen using alkylation methods known in the art. E.g., U.S. Pat. No. 5,725,651.

When using the condensation method described above to prepare the preferred heterocyclic-substituted quinacridone pigments of formula (Ib), in which the heterocyclic substituents contain fused-on aromatic rings, the preferred amines are anilines having formula (IIIa)

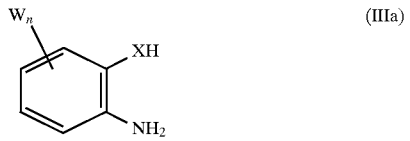

(IIIa)

in which X, W, and n are defined as above. The fused-on aromatic rings can be substituted with up to four substituents, including $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, or nitrile or can be fused with additional aromatic rings to form polyaromatic systems. Heteroaromatic analogs of compounds (IIIa) can also be used to prepare heteroaromatic-substituted quinacridone pigments analogous to the compounds of formula (Ib). Preferred amines (III) are those having no W groups (i.e., where n is 0) and are represented by formula (IIIb)

(IIIb)

in which X is O, S, or NR (wherein R is hydrogen or $C_1$–$C_6$ alkyl). Preferred amines of formula (IIIb) include 1,2-phenylenediamine (i.e., where X is $NH_2$), 2-aminophenol (i.e., where X is OH), and 2-aminobenzenethiol (i.e., where X is SH). Related ring-substituted compounds include 2,3-diaminotoluene and 3,4-diaminotoluene, which are isomeric amines of formula (IIIa) in which X is $NH_2$, W is methyl, and n is 1.

Suitable amines (III) also include heteroaromatic amines such as 2,3-diaminopyridine and 4,5-diaminopyrimidine (i.e., where X is $NH_2$ and $R^1$ and $R^2$ together are fused-on heteroaromatic rings); aliphatic amines such as 2-aminoethanol (i.e., where X is OH) and 2-aminoethanethiol (i.e., where X is SH); and cycloaliphatic amines such as 1,2-diaminocyclohexane, 2-aminocyclohexanol, and 1-amino-2-thiocyclohexane, (i.e., where $R^1$ and $R^2$ together are 1,4-butylene to form a cyclohexane ring and X is respectively $NH_2$, OH, and SH).

Heterocyclic-substituted quinacridone pigments of formula (I) are preferably prepared by the condensation of a carboxy-substituted quinacridone of formula (II) with an excess of an amine of formula (III) in the presence of dehydrating agent. Suitable dehydrating agents include sulfuric acid and other mineral acids, sulfonic acids such as methanesulfonic acid and p-toluenesulfonic acid, phosphoric acid and acidic monoesters and diesters thereof, polyphosphoric acid, boric acid, organic acids, and Lewis acids such as $FeCl_3$ and $AlCl_3$. When using acids that are not liquids, such as boric acid, $FeCl_3$, or $AlCl_3$, the condensation reaction is normally carried out in an inert solvent. In a preferred method, a carboxy-substituted quinacridone of formula (II) is condensed with at least two molar equivalents of an amine of formula (III) in polyphosphoric acid at elevated temperature (e.g., 30° to 200° C.).

Although generally less preferred, it is possible to use trichloromethyl-substituted quinacridones instead of carboxy-substituted quinacridones but condensation with the amines of formula (III) must be carried out under pressure. E.g., German Offenlegungsschrift 2,619,547.

The resultant heterocyclic-substituted quinacridone pigment of formula (I) is then isolated by pouring the reaction mixture into a liquid in which the pigment is substantially insoluble, preferably water, a water-soluble (including partly water-soluble) organic liquid, or mixtures thereof, and then collected. Suitable liquids include water and mixtures of water and lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The carboxy-substituted quinacridone precursors (II) can be prepared by methods known in the art. In a preferred method, compounds of formula (II) are prepared by ring closure of carboxy-substituted 2,5-dianilinoterephthalic acid derivatives of formula (IV)

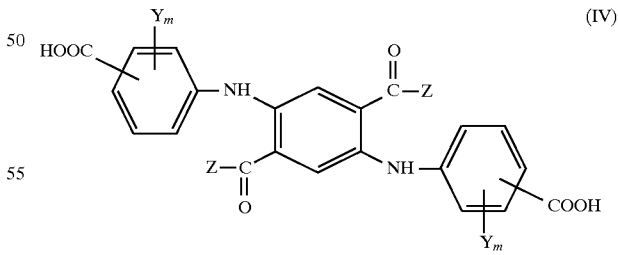

(IV)

in which Z is $OR^a$ (wherein $R^a$ is hydrogen or $C_1$–$C_6$ alkyl (preferably methyl, ethyl, or butyl and more preferably methyl)) or $NR^bR^c$ (wherein $R^b$ and $R^c$ are independently hydrogen or $C_1$–$C_6$ alkyl); each Y is independently $C_1$–$C_6$ alkyl, $C_1$–$C_6$ alkoxy, halogen, carboxyl or an ester or an amide thereof, or a sulfonyl group; and m is 0, 1, or 2. Compare U.S. Pat. Nos. 3,752,817 and 3,873,548. Preferred carboxy-substituted 2,5-dianilinoterephthalic acid derivatives are the free acids and esters of formula (IVa)

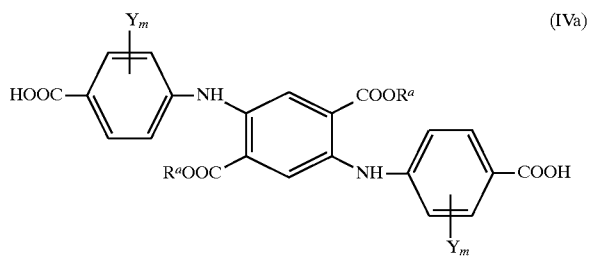

in which $R^a$ is hydrogen or $C_1$–$C_6$ alkyl and Y and m are defined as above. Particularly preferred carboxy-substituted 2,5-dianilinoterephthalic acid derivatives are esters of formula (IVa) in which $R^a$ is methyl or ethyl (preferably methyl) and m is 0 (meaning that no group Y is present).

Other methods for preparing compounds of formula (II) can, of course, also be used. For example, U.S. Pat. No. 3,726,874 describes the preparation of carboxy-substituted quinacridones by acid hydrolysis of corresponding trifluoromethyl-substituted quinacridones.

It is sometimes desirable to isolate the carboxy-substituted quinacridones of formula (II) before carrying out the condensation reaction with amines of formula (III), especially if by-products or other impurities form during the ring closure reaction. However, it is often possible, and sometimes preferred, to carry out the condensation reaction without first isolating the carboxy-substituted quinacridones. The desirability or necessity of an isolation step can readily be determined.

Carboxy-substituted 2,5-dianilinoterephthalic acid derivatives of formula (IV) can be prepared by known methods such as condensation of succinylsuccinic compounds of formula (V)

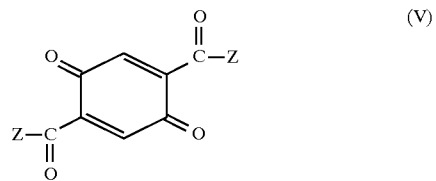

in which Z is $OR^a$ (wherein $R^a$ is hydrogen or $C_1$–$C_6$ alkyl (preferably methyl, ethyl, or butyl and more preferably methyl)) or $NR^bR^c$ (wherein $R^b$ and $R^c$ are independently hydrogen or $C_1$–$C_6$ alkyl) with aminobenzoic acids of formula (VI)

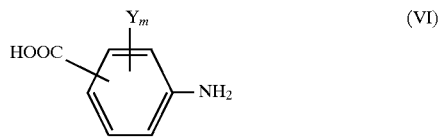

in which each Y is independently $C_1$–$C_6$ alkyl, $C_1$–$C_6$ alkoxy, halogen, carboxyl or an ester or an amide thereof, or a sulfonyl group and m is 0, 1, or 2. It is also possible to use analogous aminobenzoic esters or aminobenzonitriles for the condensation of succinylsuccinic compounds of formula (V) but subsequent reactions are required to obtain the —COOH group.

Succinylsuccinic compounds of formula (V) can be prepared by methods known in the art. E.g., W. Herbst and K. Hunger, *Industrial Organic Pigments*, 2nd ed. (New York: VCH Publishers, Inc., 1993), page 456; H. Zollinger, *Color Chemistry* (VCH Verlagsgessellschaft, 1991), page 239; F. F. Ehrich, "Quinacridone Pigments" in *Pigment Handbook*, Vol. I, edited by P. A. Lewis (John Wiley & Sons, 1988), page 604; and U.S. Pat. No. 5,367,096. For example, the preferred dialkyl succinylsuccinates of formula (Va)

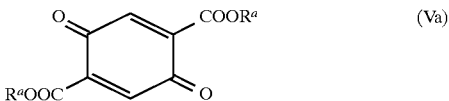

in which $R^a$ is $C_1$–$C_6$ alkyl, can be prepared by cyclization of the corresponding dialkyl succinates. Dimethyl and diethyl succinylsuccinates (especially dimethyl succinylsuccinate) are particularly suitable and are commercially available, for example, from Hoechst AG, DSM Chemie Linz, and Aldrich Chemical. Succinylsuccinic acid (as the free acid or metal salts) and amides thereof are generally less preferred.

Aminobenzoic acids of formula (VI) can be prepared by known methods but are also often commercially available. The selection of Y and m depends, of course, on the particular heterocyclic-substituted quinacridone derivatives that are ultimately to be prepared. For example, quinacridones (I) not having Y substituents would ultimately be derived from unsubstituted aminobenzoic acid, in which Y groups are absent (i.e., where m is 0). p-Aminobenzoic acids are used to prepare the preferred compounds of formula (I) of the invention.

In a preferred method for preparing carboxy-substituted 2,5-dianilinoterephthalic acid derivatives of formula (IV), a succinylsuccinic compound of formula (V) is condensed with an aminobenzoic acid of formula (VI) in an alcohol solvent (such as methanol or ethanol) in the presence of an acid catalyst (such as hydrochloric, sulfuric, or acetic acid), preferably at the boiling point of the solvent. The resultant intermediate is oxidized and hydrolyzed, for example, using aromatic nitro compounds (such as nitrobenzene), chloranil, anthraquinone-2-sulfonic acid or a salt thereof, anthraquinone-2,7-disulfonic acid or a salt thereof, air or other oxygen-containing gases, halogens, or electrolytic oxidation in conjunction with a base (such as alkali metal hydroxide). Acidification of the basic solution produces the carboxy-substituted 2,5-dianilinoterephthalic acid derivative (IV).

If the trifluoromethyl method of U.S. Pat. No. 3,726,874 (mentioned above) is used, compounds of formula (VII)

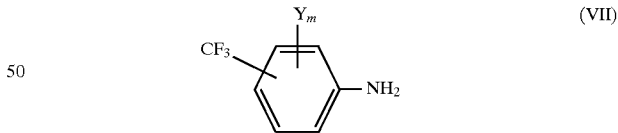

in which Y and m are defined as above, are used instead of the aminobenzoic acids of formula (VI) and the resultant trifluoromethyl-substituted quinacridones is hydrolyzed in acid to provide carboxy-substituted quinacridones.

It is possible, although generally less preferred, to introduce the heterocyclic group before ring closure by reaction of carboxy-substituted 2,5-dianilinoterephthalic acid derivatives of formula (IV) with amines of formula (III) to produce heterocyclic-substituted 2,5-dianilinoterephthalic acid derivatives of formula (VIII)

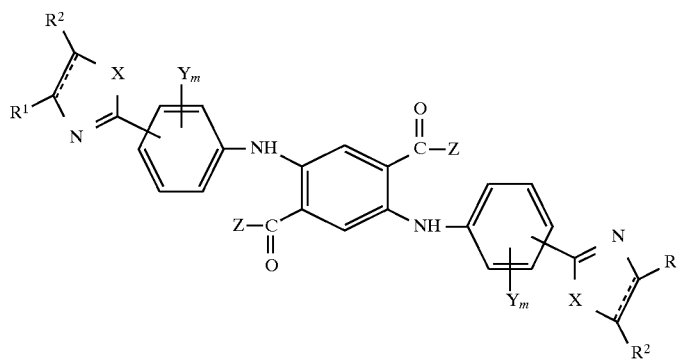

(VII)

in which X, Y, Z, $R^1$, $R^2$, and m are defined as above. Compounds of formula (VIII) can then be ring closed in the usual manner to form heterocyclic-substituted quinacridones of formula (I) of the invention. For example, the preferred heterocyclic-substituted quinacridone pigments of formula (Ib) can be prepared from corresponding compounds of formula (IX)

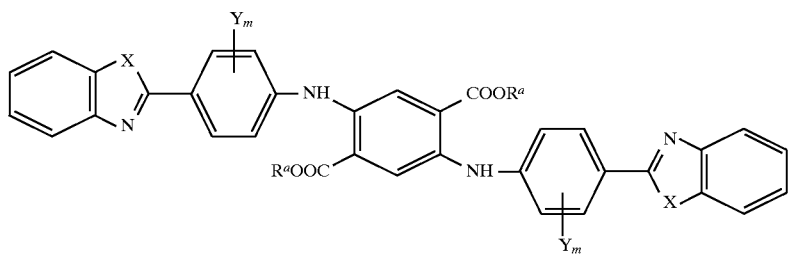

(IX)

in which X, Y, $R^a$, and m are defined as above.

Regardless of the method used to prepare the heterocyclic-substituted quinacridones according to the invention, the resultant pigments are generally conditioned and surface-treated to provide improved pigmentary properties.

Although many suitable conditioning methods are known to those skilled in the art, the most commonly used methods involve dissolving or suspending the crude pigment in strong mineral acids, followed by precipitation, treating with a solvent other than a strong acid, and/or milling the crude pigment. Conditioning with a strong acid, although possible, is generally not required for the heterocyclic-substituted quinacridones according to the invention. However, if conditioning with a strong acid is used in combination with other conditioning methods, the acid treatment is generally carried out before the other methods.

Conditioning with a strong acid involves treatment with aqueous mineral acid (preferably sulfuric acid) in a process known as "acid pasting" (in which an acidic solution containing protonated pigment is formed) or "acid swelling" (in which a suspension of protonated pigment is formed). A sufficient amount of mineral acid, preferably concentrated acid, is added to insure formation of an acidic solution or suspension within a reasonable amount of time. However, except for the requirement that the solution or suspension be acidic, the amount and concentration of acid is generally not critical. For example, more dilute acid may be used if the stirring time is extended, but use of the more concentrated acids is preferred for commercial applications. Suitable mineral acids include sulfuric acid and polyphosphoric acid, with sulfuric acid being preferred. It is particularly preferred to use at least 64% aqueous sulfuric acid in amounts of about 4 to about 15 parts by weight of acid relative to the quantity of pigment. Although the dissolution rate of pigment in acid can be increased by warming the mixture (for example, to about 50° C.), it is generally preferred to dissolve the pigment in acid at or below 35° C. to minimize sulfonation (when using sulfuric acid) or degradation of the pigment. After the acid treatment is completed, the pigment is precipitated by adding the strongly acidic solution to a liquid in which the pigments are completely or almost completely insoluble, preferably water or methanol or other lower aliphatic alcohols (such as ethanol, propanol, or butanol), as well as mixtures thereof.

It is also possible to condition the crude pigment using a solvent other than a strong acid. Suitable solvents include organic acids, such as formic or acetic acid; alcohols, such as methanol, ethanol, or ethylene glycol; ethers such as dioxane, tetrahydrofuran, ethylene glycol monoethyl or diethyl ether, or oligo- and polyglycol ethers; ketones, such as acetone or methyl ethyl ketone; aromatics, such as toluene, xylene, chlorobenzene, nitrobenzene, or chloronaphthalene; esters, such as methyl benzoate, dimethyl phthalate, or methyl salicylate; amides, such as formamide, dimethylformamide, or N-methylpyrrolidone; and sulfoxides, such as dimethyl sulfoxide.

The pigment thus obtained is collected by methods known in the art, preferably by filtration followed by washing to remove residual acid. Other collection methods known in the art, such as centrifugation or even simple decantation, are suitable but generally less preferred. The pigment is then dried for use or for further conditioning, for example, by milling. Milling can, of course, be used instead of acid or solvent treatment.

Suitable milling methods include dry-milling methods, such as sand-milling, ball-milling, and the like, and wet-milling methods, such as salt-kneading, bead-milling, and the like in water or organic liquids (such as alcohols or esters), with or without additives. Milling can be carried out using additives such as inorganic salts (especially for dry milling) and surfactants or dispersants, particularly various known sulfonamide, carboxamide, and aminoalkyl derivatives of phthalocyanines or quinacridones (especially for wet milling). Suitable milling liquids for wet milling include organic liquids, such as alcohols, esters, ethers, ketones, and aliphatic or aromatic hydrocarbons and derivatives thereof, and inorganic liquids, such as water.

After the milling step is completed, an optional solvent treatment can also be used, generally at temperatures between about 10° C. and about 200° C. The optional solvent treatment is preferably carried out at elevated temperatures, such as 60° C. to 145° C. Suitable solvents for the optional solvent treatment include water; inorganic acids, such as sulfuric or phosphoric acid, adjusted to suitable strength; organic acids, such as formic or acetic acid; and various organic solvents such as alcohols (for example, methanol, ethanol, or ethylene glycol), cyclic or open-chain ethers (for example, dioxane, tetrahydrofuran, ethylene glycol monoalkyl or dialkyl ethers, and oligo- and polyglycol ethers); ketones (for example, acetone or methyl ethyl ketone), aromatics (for example, toluene, xylene, chlorobenzene, nitrobenzene, or chloronaphthalene), esters (for example, methyl benzoate, dimethyl phthalate, dimethyl succinate, or methyl salicylate), and amides (for example, formamide, dimethylformamide, or N-methylpyrrolidone). It is often advantageous to use mixtures of these solvents.

The pigments of this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials). Because of their light stability and migration properties, the pigments according to the present invention are suitable for many different pigment applications. For example, pigments prepared according to the invention can be used as the colorant (or as one of two or more colorants) for lightfast pigmented systems.

The pigments of the present invention are particularly suitable for use with macromolecular materials, especially synthetically produced macromolecular substances. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form.

The pigments of the present invention are also suitable for pigmented mixtures with other materials, pigment formulations, paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solventor water-based paints, emulsion paints for weatherproof coatings, and distempers. Printing inks include those known for use in paper, textile, and tinplate printing.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

EXAMPLES

Solvent-based paint tests were carried out using a generic alkyd melamine paint system. Pigment dispersions were prepared using a mixture of 30% AROPLAZ® 1453-X-50 alkyd resin (Reichold Chemicals, Inc.) 58% xylene, and 12% pigment, which gave a pigment-to-binder ratio of 12:30 and a total solids content of 42%. The pigment-to-binder ratio was reduced to 2:10 by the addition of 16.6% AROPLAZE 1453-X-50 alkyd resin and 6.6% RESIMENE® 717 melamine resin (Monsanto Company), which gave a total solids content of 40%. Masstone and transparency measurements were made using films applied at 152 $\mu$m and 38 $\mu$m wet film thickness, respectively, and flashed at room temperature for 30 minutes and at 121° C. for 30 minutes.

Undertone tint paints were prepared from the dispersion described above having a pigment-to-binder ratio 12:30 by adding 40% of a dispersion prepared from 30% AROPLAZ® 1453-X-50 alkyd resin, 19.5% xylene, 0.5 NUOSPERSE® 657 (Hüls America), and 50% TI-PURE® R-960 TiO$_2$ pigment (DuPont); 52% AROPLAZ® 1453-X-50 alkyd resin; and 8% RESIMENE® 717 melamine resin, which gave a pigment-to-binder ratio of 1:2, a total solids content of 50%, and TiO$_2$-to-pigment ratio of 90:10. Color measurements were made using films applied at 76 $\mu$m wet film thickness and flashed at room temperature for 30 minutes and at 121° C. for 30 minutes.

Metallic paints were prepared from the dispersion described above having a pigment-to-binder ratio of 12:30 using an aluminum paste (available as 5251 AR from Siberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 43%. Color measurements were made using film applied at 76 $\mu$m wet film thickness and flashed at room temperature for 30 minutes and 121° C. for 30 minutes.

Example 1

Preparation of 2,5-p-dicarboxyanilinoterephthalic acid

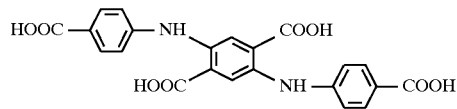

To 400 g of methanol was added with stirring 62.3 g (0.27 mol) of dimethyl succinylsuccinate, 97.2 g (0.71 mol) of p-aminobenzoic acid (Aldrich Chemical Co., Milwaukee, Wis.), and 1.3 g of concentrated sulfuric acid. The reaction was heated slowly to 95°–10° C. and maintained at that temperature for five hours. After the reaction mixture was cooled to room temperature, 68.7 g of sodium 3-nitrobenzenesulfonate, 200 g of 45% aqueous potassium hydroxide, and 50 g of water were slowly added with stirring. The resultant mixture was slowly heated to 90°–95° C. and maintained at that temperature for fours. The reaction mixture was cooled to room temperature and added to 400 g of water. The total volume of the mixture was adjusted to 2300 mL with water. Concentrated sulfuric acid was slowly added to produce a solid that was collected by filtration and washed with water. The wet presscake was dried in an oven to give 108.6 g (91.2% of theory) of 2,5-p-dicarboxyanilinoterephthalic acid.

Example 2

Preparation of 2,9-dicarboxyquinacridone

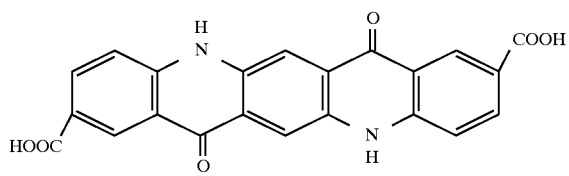

To 500 g of polyphosphoric acid (117.6% phosphoric acid) heated to 80° C. was added 50 g of 2,5-p-dicarboxyanilinoterephthalic acid over a period of 20 minutes while maintaining a temperature below 90° C. The reaction mixture was then heated at 125° C. for three hours. The melt was cooled to 80° C., then slowly added to 1 kg of water and stirred for one hour. The solid was collected by filtration and washed with water. The wet presscake was dried in an oven at 60° C. to give 42.5 g of 2,9-dicarboxyquinacridone.

Example 3

Preparation of 2,9-di(2-benzothiazolyl)quinacridone (Method A)

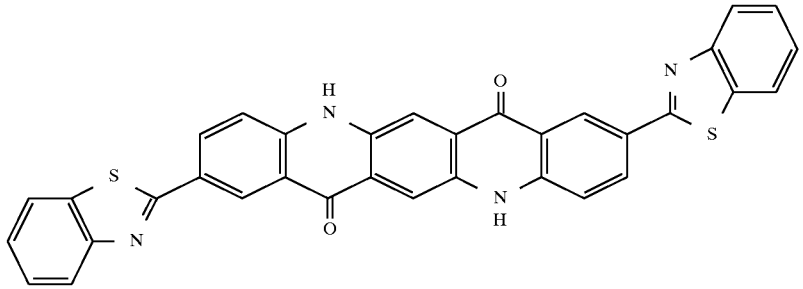

To 200 g of polyphosphoric acid (118.1% phosphoric acid) heated to 60° C. was added 8.82 g of 2-aminothiophenol over a period of five minutes. After the mixture was heated to 85° C., 10 g of 2,9-dicarboxyquinacridone was added over a period of ten minutes. The reaction mixture was heated at 175°–180° C. for three hours. The melt was cooled to 80° C. and then slowly added to 500 g of ice-water and stirred for 30 minutes. The solid was collected by filtration and washed with water. The wet presscake was dried in an oven at 60° C. to give 14.3 g of 2,9-di(2-benzothiazolyl)quinacridone.

Example 4

Preparation of 2,9-di(2-benzothiazolyl)quinacridone (Method B)

2,9-Di(2-benzothiazolyl)quinacridone was prepared without isolation of the 2,9-dicarboxyquinacridone intermediate.

To 240 g of polyphosphoric acid (117.5% phosphoric acid) heated to 80° C. was added 30 g of 2,5-p-dicarboxyanilinoterephthalic acid over a period of ten minutes while maintaining a temperature below 100° C. The reaction mixture was heated at 125° C. for three hours. After the reaction mixture was cooled to 90° C., 26.4 g of 2-aminothiophenol was added over a period of ten minutes while maintaining the temperature at 100° C. The reaction mixture was heated at 175°–180° C. for three hours. The melt was cooled to 90° C. and then slowly added to 361 g of methanol over a period of 15 minutes while maintaining a temperature below 65° C. The slurry was heated at reflux for one hour, cooled below 60° C., and diluted with water, after which the solid was collected by filtration and washed with water until acid free. The wet presscake was dried in an oven at 60° C. to give 33.4 g of g (84% of theory) of 2,9-di(2-benzothiazolyl)quinacridone.

Example 5

Preparation of 2,9-di(2-benzimidazolyl)quinacridone

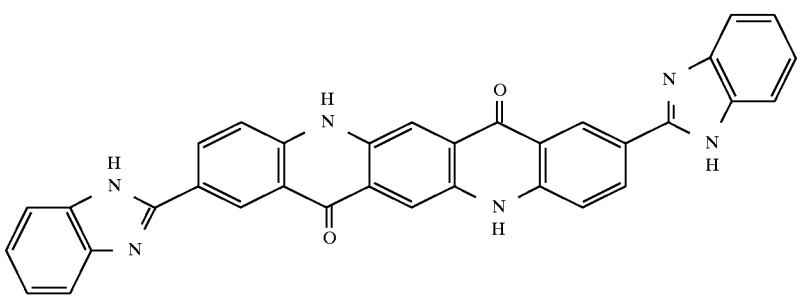

To 300 g of polyphosphoric acid (117.5% phosphoric acid) heated to 80° C. was added 30 g of 2,5-p-dicarboxyanilinoterephthalic acid over a period of ten minutes, while maintaining a temperature below 100° C. The reaction mixture was heated at 125° C. for three hours. After the reaction mixture was cooled to 90° C., 19.4 g of 1,2-phenylenediamine was added over a period of ten minutes while maintaining the temperature at 110° C. The reaction mixture was heated at 175°–180° C. for three hours. The melt was cooled to 130° C. and then slowly added to 420 g of methanol over 15 minutes while maintaining a temperature below 65° C. The slurry was heated at reflux for one hour, cooled below 60° C., and diluted with water, after which the solid was collected by filtration and washed with water until acid free. The wet presscake was dried in an oven at 60° C. to give 34.2 g of g (98% of theory) of 2,9-di(2-benzimidazolyl)quinacridone.

Examples 6–8

Pigments according to the invention were conditioned by milling to reduce particle size (Example 6) and by autoclaving to induce particle growth (Examples 7 and 8). The conditioned pigments were then evaluated in the paint systems described above.

Example 6

Crude 2,9-di(2-benzothiazolyl)quinacridone (18 g) was reslurried in 153 g of water with 1.8 g of DYSPERBYK⁷ 183 (BYK-Chemie USA, Wallingford, Conn.). The slurry was milled for eight hours using an Eiger mill containing glass beads at 3500 rpm. The milled slurry was discharged, filtered, and washed. The presscake was reslurried in 250 g of water, adjusted to pH 4.5, and held at 50° C. An aqueous emulsion containing 1.08 g of an anionic sulfosuccinate surfactant and 9.0 g of petroleum distillate was added and the mixture stirred at 50° C. for three hours. The solid component of the resultant slurry was collected by filtration and washed with water. The wet presscake was dried at 60° C. overnight to yield 18.9 g of pigment.

A solvent-based alkyd metallic paint prepared as described above exhibited a very bright brownish shade.

Example 7

Crude 2,9-di(2-benzothiazolyl)quinacridone presscake (225 g, corresponding to 36.0 g of 100% strength pigment) was reslurried in 300 g of water and the pH was adjusted to 9.8. The slurry was heated at 140°–145° C. for four hours in a laboratory Parr reactor. After the slurry was allowed to cool to room temperature, a solution of 3.0 g of wood rosin dissolved in 25 g of water was added at pH 9.0 and stirred at 50° C. for 30 minutes. A solution of 6.0 g of calcium chloride dihydrate dissolved in 30 g of water was then added and the mixture was then stirred at 50° C. for one hour. The solid component of the resultant slurry was collected by filtration and washed with water. The wet presscake was dried at 60° C. overnight to yield 41.4 g of a camouflage green pigment.

A solvent-based alkyd metallic paint prepared as described above exhibited a very bright greenish gold shade.

Example 8

Crude 2,9-di(2-benzimidazolyl)quinacridone presscake (105 g, corresponding to 26.8 g of 100% strength pigment) was reslurried in 275 g of water and the pH was adjusted to 9.0. The slurry was heated at 140°–145° C. for four hours in a laboratory Parr reactor. After the slurry was allowed to cool to room temperature, a solution of 2.5 g of wood rosin dissolved in 25 g of water was added at pH 9.0 and stirred at 50° C. for 30 minutes. A solution of 5.0 g of calcium chloride dihydrate dissolved in 25 g of water was then added and the mixture was then stirred at 50° C. for one hour. The solid component of the resultant slurry was collected by filtration and washed with water. The wet presscake was dried at 60° C. overnight to yield 29.4 g of a brick-red pigment.

A solvent-based alkyd metallic paint prepared as described above exhibited a very bright brick red shade.

What is claimed is:

1. A quinacridone pigment having the formula

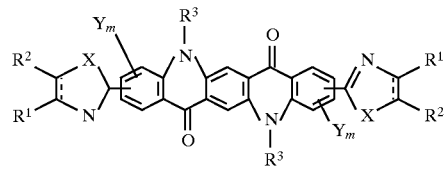

wherein

X is O, S, or NR;

R is hydrogen, $C_1$–$C_6$ alkyl, $C_5$–$C_7$ cycloalkyl, or $C_7$–$C_{16}$ aralkyl;

Y is $C_1$–$C_6$ alkyl, $C_1$–$C_6$ alkoxy, or halogen;

the dashed line represents an optional double bond;

$R^1$ and $R^2$ are independently hydrogen, $C_1$–$C_6$ alkyl, $C_5$–$C_7$ cycloalkyl, $C_6$–$C_{10}$ aryl, $C_7$–$C_{16}$ aralkyl, nitrile, or carboxyl or an ester or an amide thereof, or $R^1$ and $R^2$ together form a $C_5$–$C_8$ cycloaliphatic ring or a fused-on aromatic or heteroaromatic ring;

$R^3$ is hydrogen or $C_1$–$C_6$ alkyl; and m is 0, 1, or 2.

2. A quinacridone pigment according to claim 1 having the formula

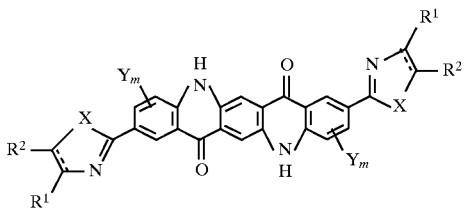

wherein

X is O, S, or NR;

R is hydrogen, $C_1$–$C_6$ alkyl, $C_5$–$C_7$ cycloalkyl, or $C_7$–$C_{16}$ aralkyl;

Y is $C_1$–$C_6$ alkyl, $C_1$–$C_6$ alkoxy, or halogen;

the dashed line represents an optional double bond;

$R^1$ and $R^2$ are independently hydrogen, $C_1$–$C_6$ alkyl, $C_5$–$C_7$ cycloalkyl, $C_6$–$C_{10}$ aryl, $C_7$–$C_{16}$ aralkyl, nitrile, or carboxyl or an ester or an amide thereof, or $R^1$ and $R^2$ together form a $C_5$–$C_8$ cycloaliphatic ring or a fused-on aromatic or heteroaromatic ring; and m is 0, 1, or 2.

3. A quinacridone pigment according to claim 1 having the formula

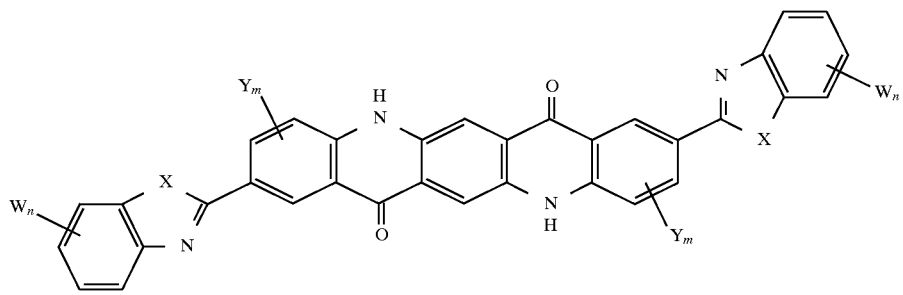

wherein
X is O, S, or NH;
Y is $C_1$–$C_6$ alkyl, $C_1$–$C_6$ alkoxy, or halogen;
W is $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, or nitrile and n is 0 or 1 to 4, or any two adjacent W form a fused-on aromatic ring; and
m is 0, 1, or 2.

4. A quinacridone pigment according to claim 1 having the formula

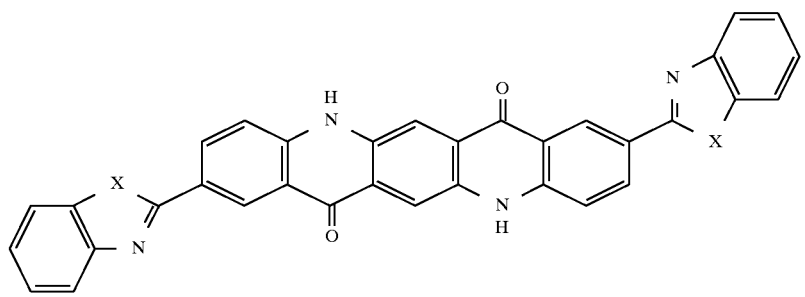

wherein X is O, S, or NH.

5. A process for preparing a quinacridone pigment having the formula

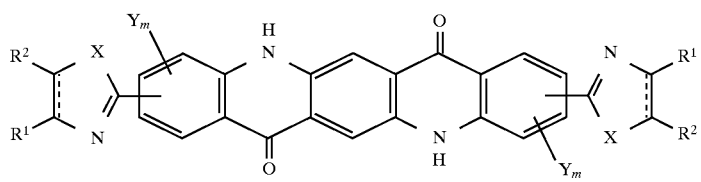

wherein
X is O, S, or NR;
R is hydrogen, $C_1$–$C_6$ alkyl, $C_5$–$C_7$ cycloalkyl, or $C_7$–$C_{16}$ aralkyl;
Y is $C_1$–$C_6$ alkyl, $C_1$–$C_6$ alkoxy, or halogen;
the dashed line represents an optional double bond;
$R^1$ and $R^2$ are independently hydrogen, $C_1$–$C_6$ alkyl, $C_5$–$C_7$ cycloalkyl, $C_6$–$C_{10}$ aryl, $C_7$–$C_{16}$ aralkyl, nitrile, or a carboxylic ester or amide, or $R^1$ and $R^2$ together form a $C_5$–$C_8$ cycloaliphatic ring or a fused-on aromatic or heteroaromatic ring; and
m is 0, 1, or 2,
comprising condensing (1) a carboxy-substituted quinacridone of the formula

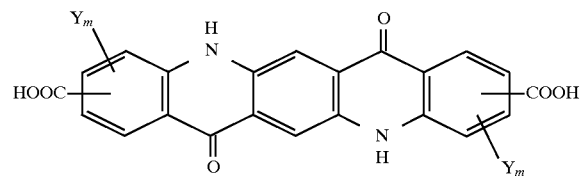

wherein
Y is $C_1$–$C_6$ alkyl, $C_1$–$C_6$ alkoxy, or halogen, and
m is 0, 1, or 2,
with (2) an amine of the formula

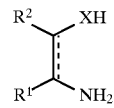

wherein
X is O, S, or NR,
R is hydrogen, $C_1$–$C_6$ alkyl, $C_5$–$C_7$ cycloalkyl, or $C_7$–$C_{16}$ aralkyl,
the dashed line represents an optional double bond;
$R^1$ and $R^2$ are independently hydrogen, $C_1$–$C_6$ alkyl, $C_5$–$C_7$ cycloalkyl, $C_6$–$C_{10}$ aryl, $C_7$–$C_{16}$ aralkyl, nitrile, or a carboxylic ester or amide, or $R^1$ and $R^2$ together form a $C_5$–$C_8$ cycloaliphatic ring or a fused-on aromatic or heteroaromatic ring.

6. A pigmented macromolecular substance containing as pigment a quinacridone pigment according claim 1.

7. A pigmented coating composition containing as pigment a quinacridone pigment according to claim 1.

8. A pigmented printing ink or ink jet ink containing as pigment a quinacridone pigment according to claim 1.

* * * * *